(12) United States Patent
Tall et al.

(10) Patent No.: US 9,925,876 B2
(45) Date of Patent: Mar. 27, 2018

(54) FLOW MASTER FOR APPARATUS TESTING

(71) Applicant: United Technologies Corporation, Hartford, CT (US)

(72) Inventors: Mary Lynn Tall, Rocky Hill, CT (US); Peggy Sansevero, East Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 307 days.

(21) Appl. No.: 14/826,485

(22) Filed: Aug. 14, 2015

(65) Prior Publication Data

US 2017/0045392 A1  Feb. 16, 2017

(51) Int. Cl.
G01L 27/00 (2006.01)
B60L 1/00 (2006.01)
G01F 25/00 (2006.01)
G01M 1/00 (2006.01)
G01F 13/00 (2006.01)

(52) U.S. Cl.
CPC ............... B60L 1/00 (2013.01); G01F 13/00 (2013.01); G01F 25/003 (2013.01); G01F 25/0053 (2013.01); G01M 1/00 (2013.01)

(58) Field of Classification Search
CPC ...... G01F 25/0007; G01F 1/34; G01F 25/003; G01F 25/0053; G01F 13/00; G01L 27/00; G01L 27/002; G01L 27/005; G01L 27/007; B60L 1/00; G01M 1/00
See application file for complete search history.

(56) References Cited

U.S. PATENT DOCUMENTS

| | | | |
|---|---|---|---|
| 5,402,666 A | 4/1995 | Chalpin | |
| 7,685,870 B2 | 3/2010 | Quinn et al. | |
| 7,971,473 B1 | 7/2011 | Meunier et al. | |
| 8,056,403 B2 | 11/2011 | Traverso et al. | |
| 8,438,915 B2 | 5/2013 | McCall et al. | |
| 8,534,122 B2 | 9/2013 | Mironets et al. | |
| 8,650,940 B2 | 2/2014 | Howard et al. | |

*Primary Examiner* — Robert R Raevis
(74) *Attorney, Agent, or Firm* — Kinney & Lange, P.A.

(57) ABSTRACT

An airflow testing system for an aerospace component uses a flow master with a first sealing surface, a hollow body, and a metering plate. A desired back pressure across a flow path through the aerospace component is determined, and used to form a metering outlet through the metering plate. The plate is attached to the hollow body in a fluid seal, the flow master is secured to a testing position in a fluid seal, and back pressure across the flow master is sensed while flowing air through the flow master. The difference between desired and sensed back pressure is used to evaluate the airflow testing system.

20 Claims, 7 Drawing Sheets

FLOW MASTER FOR APPARATUS TESTING

BACKGROUND

The present invention relates generally to the evaluation of aerospace component testing systems, and more particularly to a flow master used to check pressure testing systems.

Many aerospace components include air channels (e.g. for cooling) that are fabricated to strict specifications and tested during manufacture to ensure that fluid flow and differential pressure across these channels fall within expected ranges. The equipment used to this testing can suffer from wear, malfunction, and calibration drift, and must be periodically checked. In some cases, testing equipment may need to be recalibrated based on these checks.

Flow masters are example parts used to periodically check equipment and calibrations used in this testing. Conventional flow masters are ideal copies of a target workpiece (e.g. an airfoil), and separate masters are used to calibrate tests for each flow path within each part. Because flow masters are known to be ideal parts, the expected results of testing flow masters with testing equipment are known. If testing equipment returns unexpected results while "testing" master parts, this indicates that the testing equipment is miscalibrated, defective, or otherwise malfunctioning. Constructing a "perfect" master part can be expensive and labor intensive, and because flow masters are used to evaluate testing equipment regularly in most manufacturing settings.

SUMMARY

In one aspect, the present disclosure is directed toward a method of evaluating an airflow testing system for an aerospace component. The system uses a flow master with a first sealing surface, a hollow body, and a metering plate. First, a desired back pressure across a flow path through the aerospace component is determined, and used to form a metering outlet through the metering plate. The plate is attached to the hollow body in a fluid seal, the flow master is secured to a testing position in a fluid seal, and back pressure across the flow master is sensed while flowing air through the flow master. The difference between desired and sensed back pressure is used to evaluate the airflow testing system.

In another aspect, the present disclosure is directed towards a flow master configured to mate with a testing apparatus for testing airflow characteristics of an aerospace component. The flow master comprises a sealing surface, a hollow body, and a metering plate. The sealing surface matches a first sealing surface shape of the aerospace component, and has an inlet inlet aperture corresponding to an internal airflow path of the aerospace component. The hollow body extends from the sealing surface, and defines an interior space fluidly accessible via the inlet aperture. The hollow body has a duct opening, and the metering plate is secured in a fluid seal across the duct opening. The metering plate has a metering outlet selected to determine an overall flow loss and resulting back pressure across the flow master.

The present summary is provided only by way of example, and not limitation. Other aspects of the present disclosure will be appreciated in view of the entirety of the present disclosure, including the entire text, claims, and accompanying figures.

Figure 1:
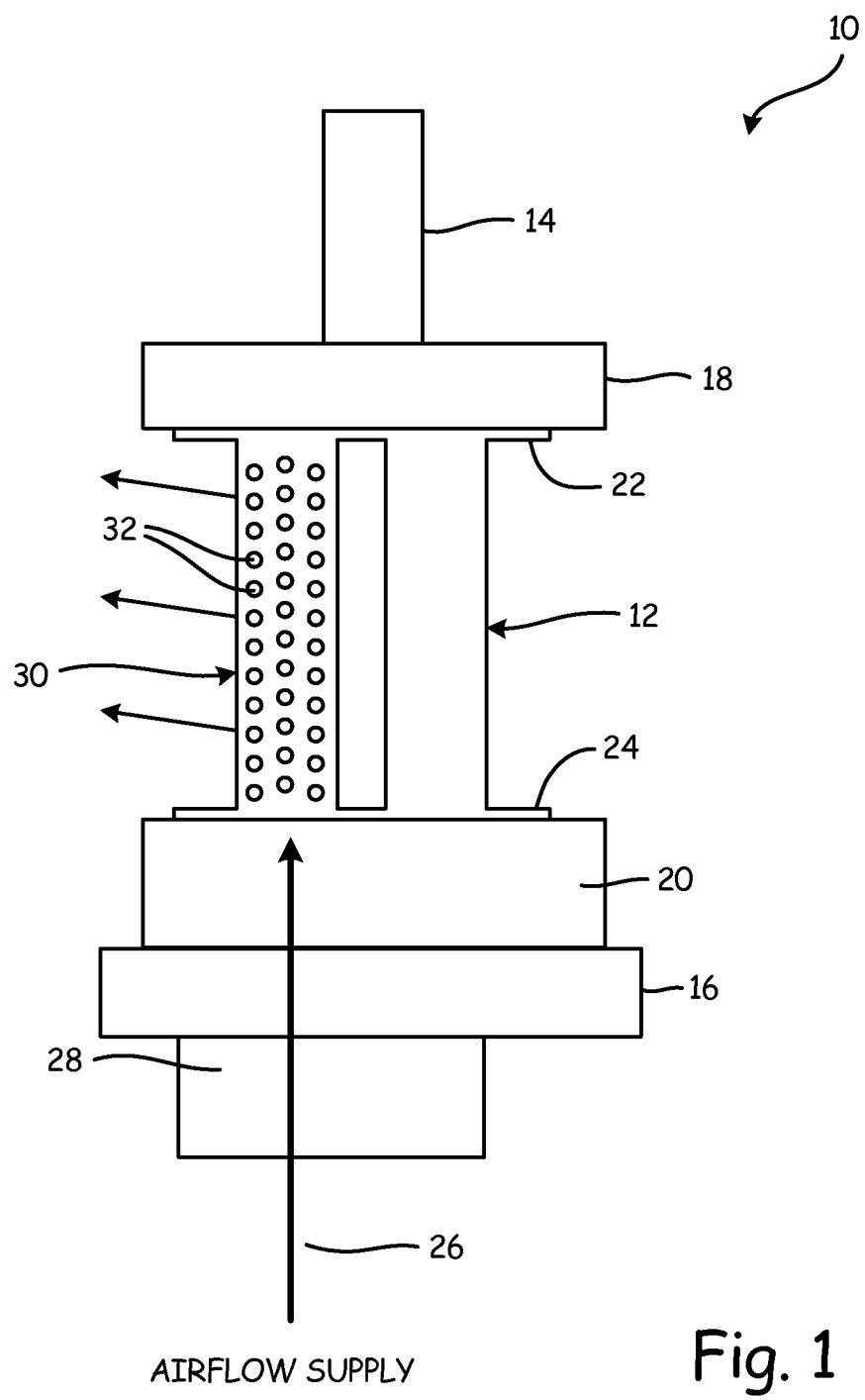
FIG. 1 is a schematic view of an airflow testing system operating on a production part.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present disclosure relates to a flow master used to evaluate testing equipment for aerospace components. This flow master includes platforms identical to production components, so as to mate with testing equipment intended for those components. The body of the flow master, however, is a simplified main passage with a duct opening fitted with a metering plate that can have a flat configuration. Holes in the metering plate form a metering outlet that determines flow and pressure loss across the flow master. This metering outlet is selected to match flow characteristics of an ideal instance of the aerospace component. The airflow master of the present invention can be fabricated to exacting specifications at low cost, and with little labor, and can be re-used with different metering plates to test evaluation of several distinct flow paths.

FIG. 1 is a schematic view of testing system 10, a system for testing aerospace components such as production piece 12. Testing system 10 is used to check that flow characteristics (e.g. flow and pressure) of internal passages of production piece 12 fall within acceptable bounds. Although the discussion hereinafter focuses on airflow, the invention can more generally be applied to any appropriate fluid flow such as steam or coolant fluid, equivalently. FIG. 1 illustrates production piece 12 secured for testing between retention assembly clamp 14 and retention assembly base 16, via inner sealing mold 18 and outer sealing mold 20. Production piece 12 includes inner platform seal 22, outer platform seal 24, workpiece body 30, and workpiece airflow outlet 32.

Inner sealing mold 18 and outer sealing mold 20 are complementary structures that mate with sealing surfaces of inner workpiece platform 22 and outer workpiece platform 24, respectively. Testing system 10 includes airflow supply 26, which provides a stream of pressurized airflow into production piece 12 through outer sealing mold 20 and back pressure sensor 28. Back pressure sensor 28 detects back pressure as airflow is injected by airflow supply 26 into workpiece body 30. Workpiece body 30 can, for example, be a hollow blade or vane having at least one internal airflow passage that lets out at workpiece airflow outlet 32.

Production piece 12 is an aerospace component with interior flow passages (e.g. for cooling), such as a turbine blade or vane of a gas turbine engine hot section. In the illustrated embodiment, production piece 12 is an airfoil segment comprising two distinct struts or airfoil elements sharing common inner and outer diameter platforms. Although production piece 12 is described herein primarily as an airfoil element such as a blade or vane, some embodiments of testing system 10 can service other types of aerospace components with interior fluid passages, such as fairings and air seals for gas turbine engines. In the illustrated embodiment, inner and outer workpiece platforms 22 and 24 can, for example, be vane platforms that define endwall contours for core engine airflow. More generally, inner and outer workpiece platforms 22 and 24 are structural elements of production piece 12 by which testing system 10 anchors production piece 12. Outer workpiece platform 24, in particular, includes an inlet aperture through which production piece 12 receives airflow (e.g. for cooling) in an assembled engine.

Sealing molds 18 and 20 are shaped sealing elements that complement and mate with workpiece platforms 22 and 24, respectively. Inner and outer sealing molds 18 and 20 are designed to match the shape of a particular production piece, so that all instances of that production piece fit snugly in testing system 10 when secured by retention assembly clamp 14 and retention assembly base 16. Retention assembly clamp 14 and retention assembly base 16 are anchoring elements that can be opened to allow production piece 12 to be inserted into testing system 10, and closed to lock production piece 12 in place. When retention assembly clamp 14 and retention assembly base 16 are locked, outer workpiece platform 24 is retained in a fluid seal with outer sealing mold 20. In some embodiments inner and outer sealing molds 18 and 20 can be detachable elements that are inserted between production piece 12 and inner retention assembly clamp 14 and retention assembly base 16, respectively. In other embodiments, retention assembly clamp 14 and retention assembly base 16 can be affixed to inner and outer sealing molds 18 and 20, respectively. Outer sealing mold 20 provides an airflow path for between airflow supply 26 and an air inlet of production piece 12. Some embodiments of testing system 10 can include multiple sealing molds, each suited for the testing of a particular airflow path. In these embodiments, each outer sealing mold 20 provides an airflow path from airflow supply to a different airflow inlet of production piece 12. Inner sealing mold 18 can, in some embodiments, also include airflow paths, e.g. directing air from one airflow path within workpiece body 30 to another. Inner and outer sealing molds 18 and 20 are tested to ensure that they together account for negligible pressure loss as pressurized air from airflow supply 26 passes through them to workpiece body 30 of production piece 12.

Testing system 10 operates by sensing back pressure from airflow forced by airflow supply 26 through outer sealing mold 20, and into workpiece body 30 of production piece 12. Back pressure is sensed by pack pressure sensor 28, which is situated in-line with fluid flow from airflow supply 26, between airflow supply 26 and outer sealing mold 20. Airflow supply 26 provides airflow to production piece 12 at a known supply pressure $P_{supply}$ representative of engine operating airflow conditions for production piece 12. As noted above, production piece 12 includes workpiece airflow outlet 32. Workpiece airflow outlet 32 can, for example, be an impingement cooling or purge aperture extending from the hollow interior to the exterior surface of workpiece body 30. Workpiece airflow outlet 32 can, in some embodiments, include a plurality of separate holes or apertures. Airflow egress through workpiece airflow at outlet 32 results in a drop in pressure within workpiece body 30, which back pressure sensor 28 detects as a sensed pressure $P_{sensed}$ through outer sealing mold 20. Testing system 10 can, for example, be used to evaluate many instances of production piece 12 during a manufacturing process. If the sensed back pressure $P_{sensed}$ deviates by more than acceptable levels from a target pressure $P_{target}$, the instance of production piece 12 being tested is flagged as potentially defective. The range of acceptable deviation of $P_{sensed}$ from $P_{target}$ is determined by part tolerances.

Figure 2:
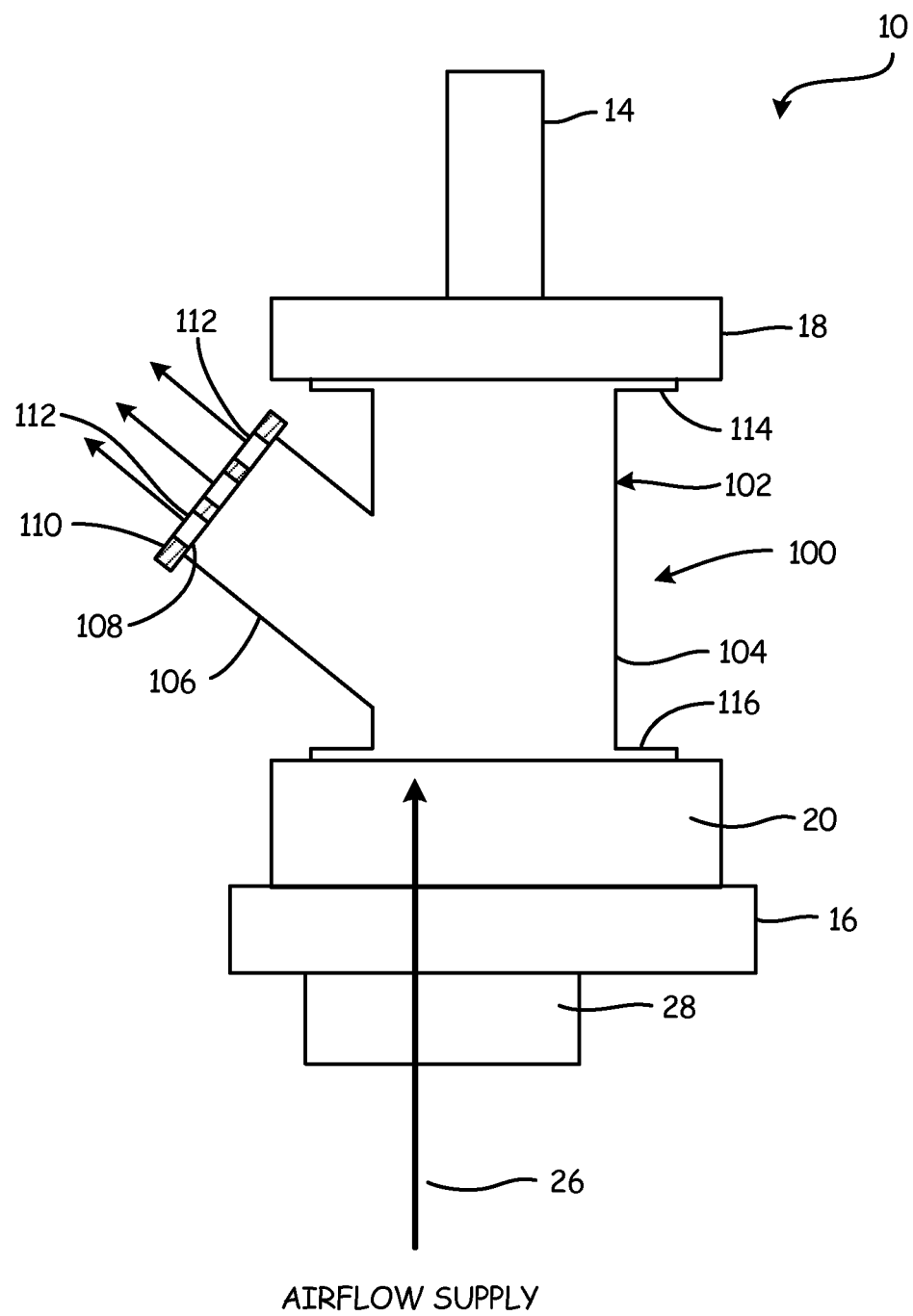
FIG. 2 is a schematic view of the airflow testing system of FIG. 1, operating on a flow master.

FIG. 2 is a schematic view of testing system 10 disposed to sense back pressure $P_{sensed}$ through flow master 100, rather than through production piece 12. FIG. 2 illustrates retention assembly clamp 14, retention assembly base 16, inner and outer sealing molds 18 and 20, airflow supply 26, and back pressure sensor 28 as described above with respect to FIG. 1. FIG. 2 further illustrates flow master 100, with flow master body 102 (including main passage 102 and outlet section 106 with duct opening 108), metering plate 110 (with metering outlet 112), flow master inner platform 114, and flow master outer platform 116.

Testing system 10 can develop problems over time, e.g. due to calibration drift, routine wear, and/or malfunction. Defects in testing system 10 can result in flaws in instances of production workpiece 12 going unnoticed, and/or in false positive fault identifications for instances of production workpiece 12. To prevent such mistakes from occurring, testing system 10 is periodically checked using flow master 100 to ensure that no problems have developed with testing system 10, and/or to allow such problems to be diagnosed and corrected. Flow master 100 mimics the airflow behavior, and particularly the expected back pressure $P_{target}$, of an ideal instance of production workpiece 12. Thus, testing system 10 can be evaluated for possible faults by checking that testing system 10 clears flow master 100, and more particularly returns $P_{sensed}=P_{target}$ (within acceptable tolerances, e.g., $P_{sensed}=P_{target}\pm\text{tolerance}$) when sensing airflow through flow master 100.

Flow master body 102 extends between flow master inner and outer platforms 114 and 116, respectively. Exterior surfaces of flow master inner and outer platforms 114 and 116 must mate with inner and outer sealing molds 18 and 20, respectively, and therefore closely match the corresponding exterior surfaces of inner and outer workpiece platforms 22 and 24, respectively, as described in greater detail below with respect to FIGS. 3-5. Flow master body 102 comprises main passage 104 and outlet section 106. Main passage 104 is a rigid, hollow element that retains exterior surfaces of flow master inner and outer platforms 114 and 116, respectively, at a fixed separation (i.e. relative position) identical to corresponding geometric features of inner and outer workpiece seals 22 and 24, respectively, of production piece 12. Main passage 104 receives airflow from airflow supply 26 through outer sealing mold 20 and back pressure sensor 28. The particular shape of main passage 104 need not match or even approximate the shape of corresponding production piece 12, and can be both simple and light to conserve material and reduce cost. Outlet section 106 is a hollow, branching region of flow master body 102 with duct opening 108. Outlet section 106 can, for example, be a cylindrical pipe or passage jutting away from main passage 104. Duct opening 108 is a large cross-section aperture in outlet section 106 that is covered by metering plate 110. Metering plate 110 is a plate removably affixed to duct opening 108 of outlet section 106, and perforated with metering outlet 112. Metering outlet 112 can, for example, be a series of slots or holes in metering plate 110. In at least one embodiment, duct opening 108 can be a circular opening at a distal end of outlet section 106, extending at an acute angle away from main passage 104. Metering plate 110 can, for example, be a planar disk or sheet secured to duct opening 108 of outlet section 106. Metering outlet 112 has a total outlet area selected to produce $P_{sensed}=P_{target}$, as described in greater detail with respect to FIG. 7. Airflow egress through metering outlet 112 accounts for the overwhelming majority of pressure loss within flow master body 102, as sensed by back pressure sensor 28. By tailoring metering outlet 112 so that $P_{sensed}=P_{target}$.

Flow master 100 is formed of a rugged material for heavy, extended use. In one embodiment, flow master 100 is a steel or aluminum part. In other embodiments, flow master 100 can be formed of durable plastic. Flow master 100 can, for example, be fabricated via additive manufacture, particularly with respect to inner and outer platforms 114 and 116.

Figure 3:
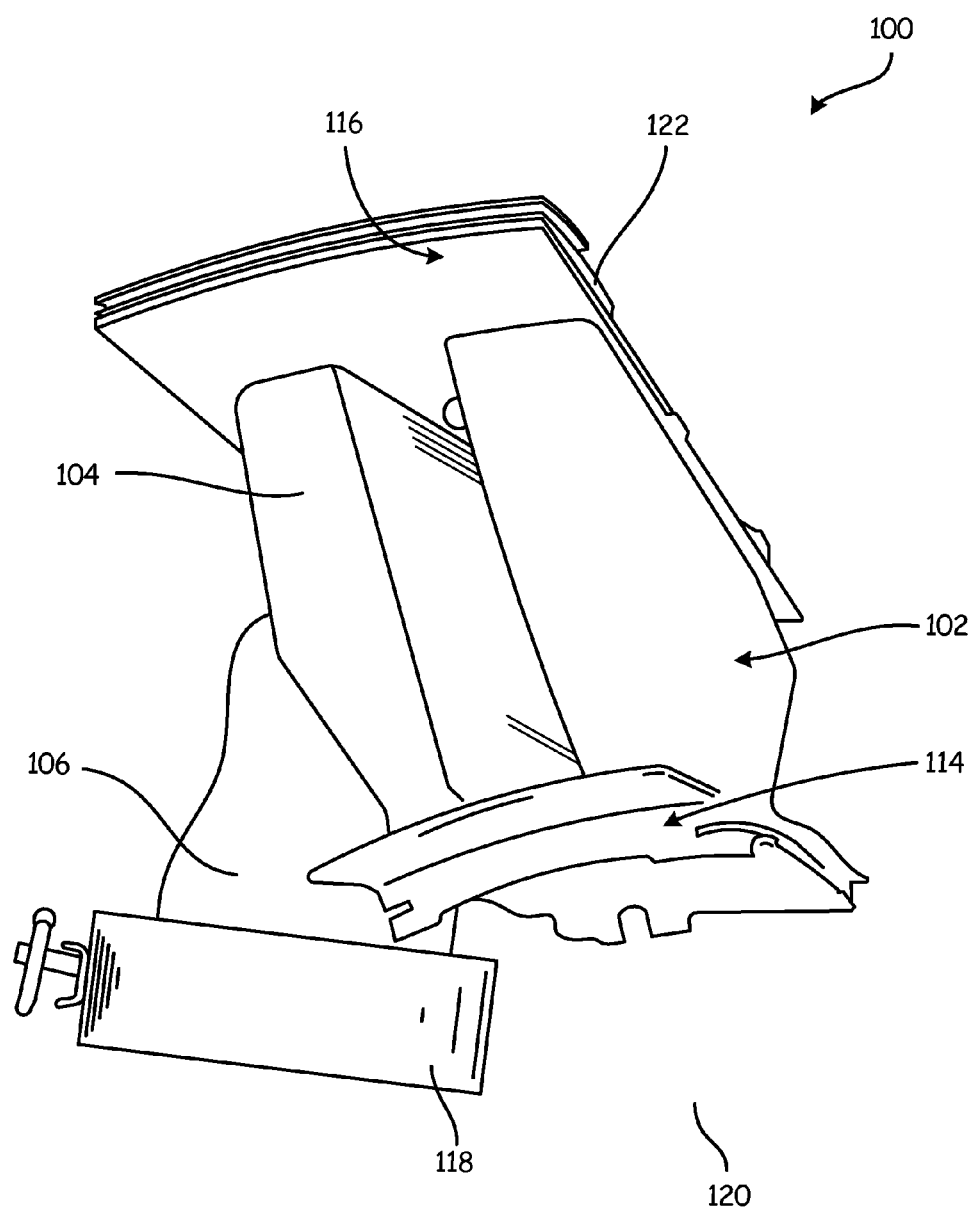
FIG. 3 is a first perspective view of the flow master of FIG. 2, in an assembled state.
Figure 4:
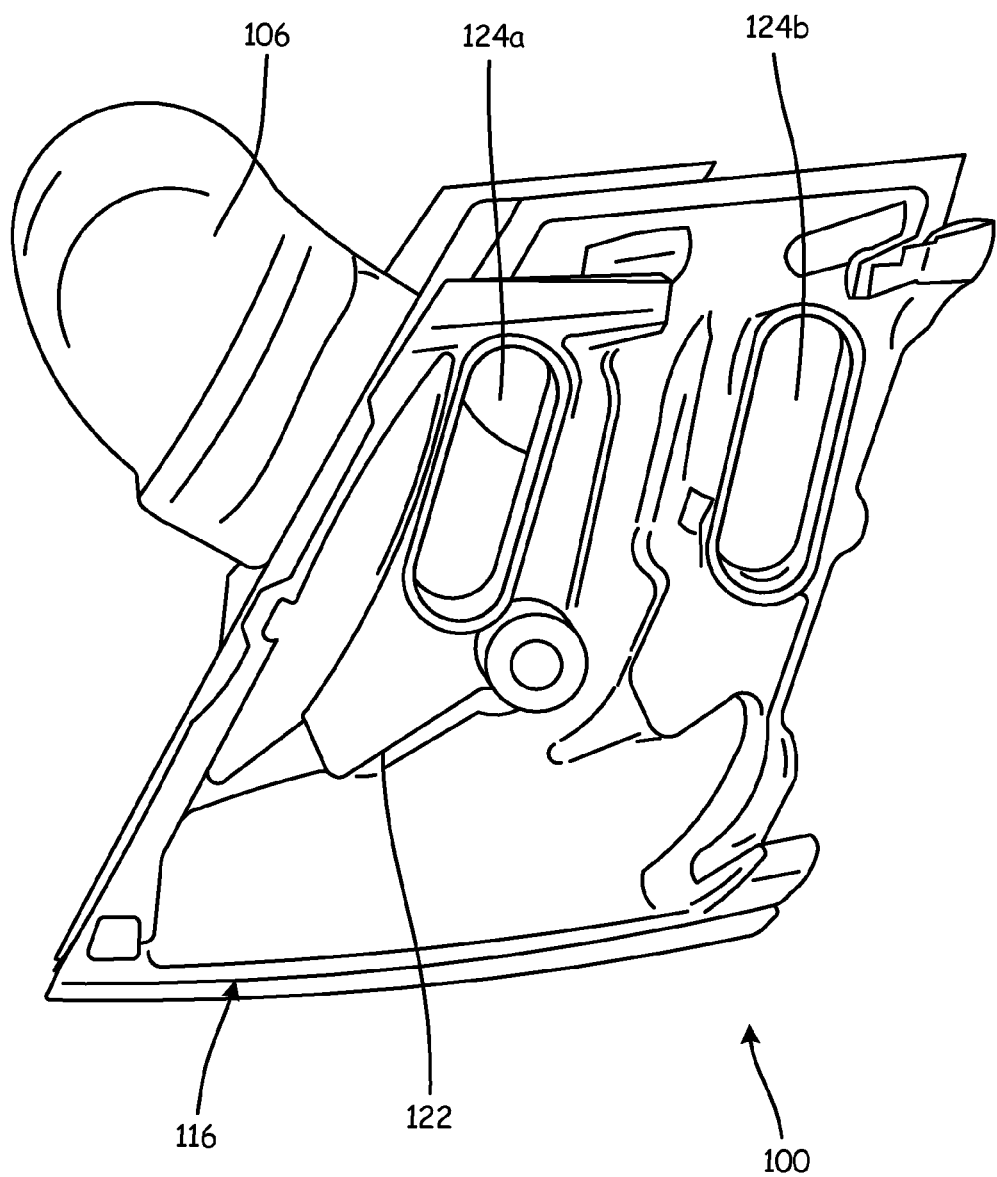
FIG. 4 is a second perspective view of the flow master of FIG. 2, illustrating an inlet platform.
Figure 5:
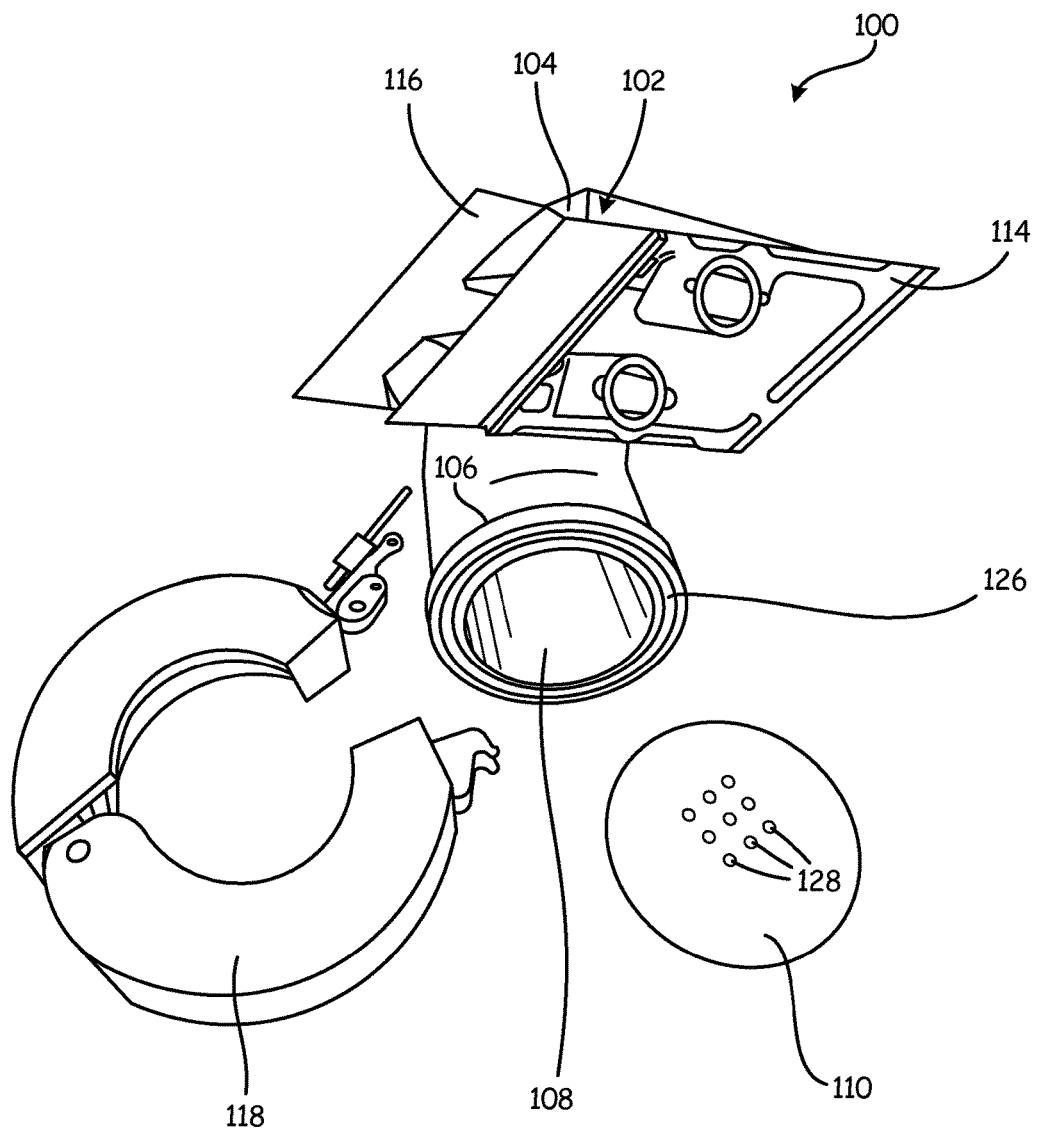
FIG. 5 is a second perspective view of the flow master of FIG. 2, in a disassembled state illustrating a metering plate.
Figure 6:
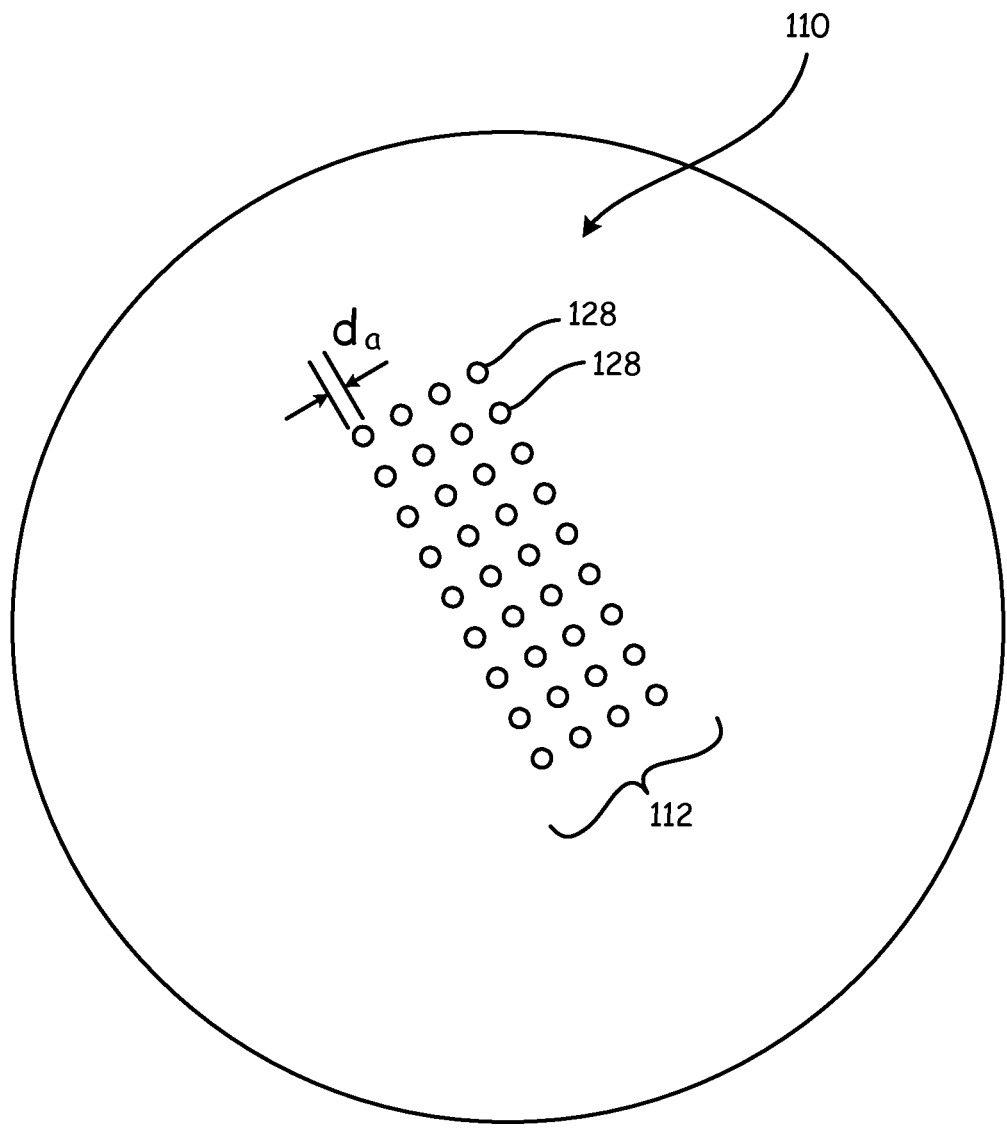
FIG. 6 is a plan view of one illustrative embodiment of the metering plate of FIG. 5.

FIGS. 3-5 are perspective views of airfoil master 100, illustrating flow master 102 with main passage 104, outlet section 106, and flow master inner and outer platforms 114 and 116 as described above with respect to FIG. 2. FIG. 3 is a perspective view of flow master 100 along flow master inner platform 114, and further illustrates band clamp 118, inner platform geometry 120, and outer platform geometry 122. FIG. 4 is a perspective view of flow master 100 facing flow master outer platform 116, and further illustrates outer platform geometry 122 and inlets 124a and 124b. FIG. 5 is a perspective view of flow master 100 in a disassembled state, and further illustrates band clamp 118, seal ring 126, and metering holes 128. FIG. 6 is a plan view of metering plate 110 illustrating metering holes 128 of metering outlet in greater detail.

FIGS. 3-5 depict an embodiment of airfoil master 100 wherein main passage 104 comprises two hollow struts (corresponding generally to simplified airfoil elements) extending between airfoil master inner and outer platforms 114 and 116. In other embodiments main passage 104 can, for example, be a single cylindrical or rectangular shell extending from airfoil master inner platform 114 to airfoil master outer platform 116.

As shown in FIG. 3, airfoil master inner and outer platforms 114 and 116 have exterior surfaces with inner and outer platform geometries 120 and 122, respectively. As noted above with respect to FIG. 2, inner and outer platform geometries 120 and 122 match corresponding geometries of inner and outer workpiece platforms, allowing the same inner and outer sealing molds 18 and 20 to mate with both production workpiece 12 and airfoil master 100.

As shown in FIG. 4, outer platform geometry 122 of airfoil master outer platform 116 includes inlets 124a and 124b, which align with back pressure sensor 28 and airflow supply 26 to receive pressurized airflow, as described above with respect to FIGS. 1 and 2. Inlets 124a and 124b extend from outer platform geometry 122 through airfoil master outer platform 116 to the hollow interior of main passage 104. Some embodiments of flow master 100 can include only a single inlet 124 (e.g. 124a and/or 124b), or more than two inlets, depending on the number of distinct airflow paths through production piece 12 that are to be simulated by flow master 100. When evaluating testing system 10 with flow master 100, airflow is, in some cases, only directed through one of several inlets 124. In particular, each airflow inlet 124 (e.g. 124a, 124b) can correspond to a distinct airflow path in production piece 12 that must be separately tested. Several such distinct airflow paths can be tested using a single flow master 100, where ordinarily multiple ideal workpieces would be required (i.e. one for each airflow path to be tested), by providing inlets 124a, 124b, etc. that all provide an airflow path into main passage 104. Differences in pressure loss within each distinct airflow path in production piece 12 can be simulated by swapping between different metering plates 110, with each metering plate 110 including a corresponding metering outlet 112 with flow area such that $P_{sensed}=P_{target}$ for the selected airflow path.

As shown in FIG. 5, band clamp 118 can be detached from outlet section 106 at duct opening 108, thereby allowing metering plate 110 to be removed. This easy removal of metering plate 110 allows different metering plates 110 to be swapped into flow master 100 to simulate distinct airflow paths, as described above. In addition, metering plate 110 can be easily removed, machined, and replaced if the sensed pressure drop $P_{sensed}$ provided by metering plate 110 is too low. FIG. 5 also illustrates seal ring 126, which interfaces with metering plate 110 to create a fluid seal that prevents air from escaping past metering plate 110 through any path other than by metering outlet 112. Seal ring 126 can, for example, be a deformable O-ring.

As illustrated in FIGS. 5 and 6, metering outlet 112 through metering plate 110 consists of a plurality of metering holes 128. In alternative embodiments, metering outlet 112 can consist of a single aperture, or of any number of apertures of any shape that in aggregate provide the desired outlet flow area. Metering plate 110 can, for example, be iteratively tailored to achieve $P_{sensed}=P_{target}$ by initially machining metering plate 110 to create a metering outlet 112 having a flow area deliberately selected to undershoot a target flow area (i.e. such that $P_{sensed}>P_{target}$), and then making small iterative changes to metering outlet 112, such as by machining additional metering holes 128, until $P_{sensed}=P_{target}$. In the embodiment of FIG. 6, each metering hole 128 has aperture diameter $d_a$, and corresponding flow area $(\pi/4)d_a^2$, such that the total flow area of metering outlet 112 is $N(\pi/4)d_a^2$, where N is the number of metering holes 128. By initially machining less than N holes (e.g. with a drill or press), an initial estimate of $P_{sensed}$ produced by a particular metering outlet 112 can be somewhat imprecise, as metering plate 110 can subsequently be machined with more metering holes 128 as needed to achieve $P_{sensed}=P_{target}$.

Figure 7:
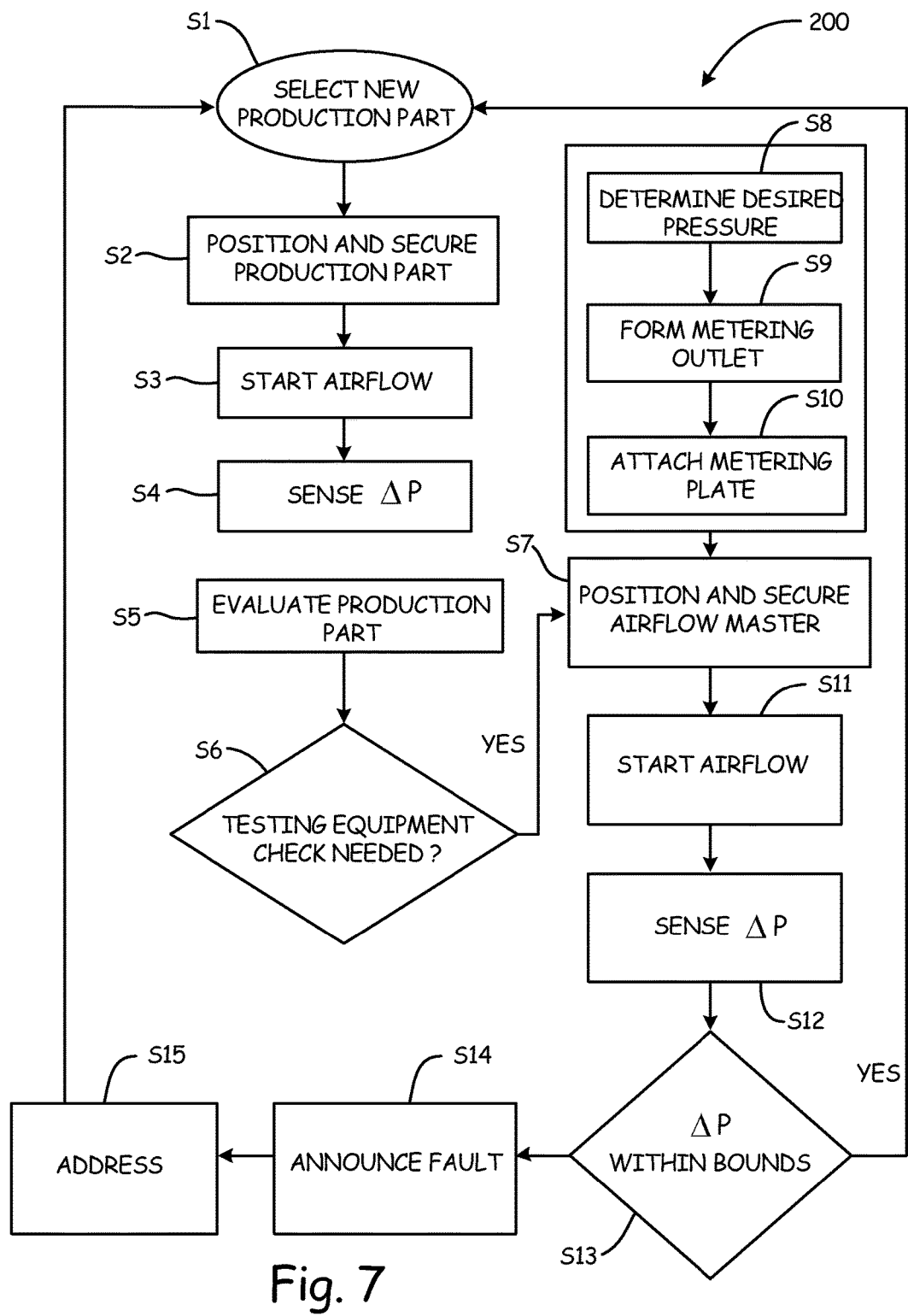
FIG. 7 is a method flowchart illustrating a method of operation for the flow master of FIG. 2.

FIG. 7 is a flowchart of method 200, a method of operation of testing system 10. As described above with respect to FIG. 1, testing system 10 is used to evaluate internal airflow characteristics of instances of production piece 12. An instance of production piece 12 is first selected for testing. (Step S1). This instance of production piece 12 can, for example, be a completed workpiece ready for qualification, or an incomplete workpiece for which pressure data (i.e. $P_{sensed}$) is needed to complete manufacture. This instance of production piece 12 is positioned between retention assembly clamp 14 and retention assembly 16, with intervening inner and outer sealing molds 18 and 20 providing a fluid seal and a complementary mating surface against inner and outer workpiece platforms 20 and 22, respectively. (Step S3). In particular, a suitable outer mold seal 20 is selected to provide an airflow path from airflow supply 26 to an inlet of production piece 12 to be tested. Retention assembly clamp 14 is then tightened to secure production piece 12 in testing system 10. Retention assembly clamp 14 can, for example, be a manual clamp, or a screw clamp driven by a torque motor configured to supply a fixed clamping torque. Once production piece 12 is secured, airflow supply 26 forces air through back pressure sensor 28 and outer sealing mold 20 into a hollow airflow passage in workpiece body 30 of production piece 12. (Step S3). Back pressure sensor 28 senses resulting back pressure $P_{sensed}$. (Step S4). If sensed back pressure $P_{sensed}$ is within acceptable bounds of target pressure $P_{target}$, the tested instance of production piece 12 is passed as adequate. Otherwise, it is identified as detective, and labeled for correction or disposal. (Step S5).

After testing a number of production parts, or after operating for a set time, testing system 10 must itself be evaluated using flow master 100. Until testing system 10 is due for such an equipment check, it can continue to be used to evaluate new instances of production piece 12. (Step S6). When an equipment check is due, however, flow master 100 is positioned and secured within testing system 10, instead of another production piece 12. (Step S7). Before flow master 100 can be used with testing system 10, however, it must be constructed such that $P_{sensed} = P_{target}$. First, target pressure $P_{target}$ must be identified. (Step S8). In some embodiments, target pressure $P_{target}$ can be a theoretical value computed analytically or via simulation. In other embodiments, target pressure $P_{target}$ can be a sensed back pressure from an airflow path within a known perfect part (e.g., a perfect instance of production piece 12). Once $P_{target}$ is known, metering outlet 112 is formed in metering plate 110. (Step S9) As discussed above, this may be done via an iterative process whereby additional metering holes 128 are added to metering plate 110 until the total outlet area of metering outlet 112 reaches desired levels. In alternative embodiments, a desired size and shape of metering outlet 112 can be calculated to high precision, and metering outlet 112 can be fabricated to this size. Once metering outlet 112 has been formed, plate 110 is secured to duct opening 108 of outlet section 106 of flow master body 102 using band clamp 118. (Step S10). Although steps S8, S9, and S10 must be performed before flow master can be used, these steps need not be repeated every time testing system 10 is to be evaluated. Once formed with appropriate metering outlet 112, metering plate 110 need not be re-machined. In some cases flow master 100 can be used as-is on several successive tests. In other cases, one metering plate 110 may need to be swapped out for another between successive tests, particularly if successive tests relate to different simulated airflow paths through production piece 12, as noted above with respect to FIGS. 3-6.

Once a completed flow master 100 has been installed and secured in testing system 10 (step S7), airflow supply 26 drives air into flow master 100 (step S11) and back pressure sensor 28 senses resulting back pressure $P_{sensed}$ (step S12) as described above with respect to steps S3 and S4. This sensed back pressure $P_{sensed}$ is compared to target pressure $P_{target}$. If $P_{sensed}$ is within acceptable bounds of $P_{target}$, testing system 10 is passed, and can resume testing workpieces (Step S13). Although $P_{sensed}$ can be allowed to deviate slightly from $P_{target}$, tolerances are stricter in the evaluation of testing system 10 than for the evaluation of any individual production piece 12. If $P_{sensed}$ deviates unacceptably from $P_{target}$, testing system 10 announces a fault, e.g. with an alarm or alert. (Step S14). This fault must then be addressed, e.g. by recalibration or repair, before testing system 10 can resume ordinary operation. (Step S15).

Method 200 and flow master 100 allow testing system 10 to be evaluated without need for a large number of perfect instances of production piece 12 for testing. Flow master 100 can simulate the operation of multiple airflow paths using different metering plates 110, reducing the total number and complexity of parts required to ensure that testing system 10 is operating properly. Back pressure from flow master 100 can be precisely tuned at low cost, and with little labor, by machining metering plates 110, and flow master 100 can be re-used with a variety of metering plates 110 to check the operation of testing system 10 with respect to several distinct flow paths.

Discussion of Possible Embodiments

The following are non-exclusive descriptions of possible embodiments of the present invention.

A method for calibrating a flow testing system for an aerospace component using a flow master, the method comprising: determining an desired back pressure through a flow path through the aerospace component; forming a metering outlet through a metering plate of the airflow master based on the desired back pressure; attaching the metering plate to a hollow body of the airflow master, in a fluid seal; positioning a first sealing surface of the flow master at a mounting location of the airflow testing system; securing the flow master to the airflow testing position in a fluid seal; flowing air through the flow master; sensing back pressure across the flow master using the airflow testing system; and evaluating the airflow testing system based on a difference between the desired back pressure and the sensed back pressure.

The method of the preceding paragraph can optionally include, additionally and/or alternatively, any one or more of the following features, configurations and/or additional components:

A further embodiment of the foregoing method, wherein determining the desired back pressure comprises: sensing back pressure across the flow path through an ideal physical copy of the aerospace component.

A further embodiment of the foregoing method, wherein positioning the first sealing surface at the mounting location comprises: aligning geometry of the first sealing surface identical to corresponding sealing surface geometry of the aerospace component with complementary geometry of a first sealing mold of the airflow testing system.

A further embodiment of the foregoing method, wherein securing the flow master to the airflow testing position comprises: clamping the first sealing surface to the first sealing mold.

A further embodiment of the foregoing method, wherein clamping the first sealing surface to the first sealing mold comprises: securing exerting a clamping force on a second sealing mold complementary to a second sealing surface opposite the hollow body from the first sealing surface.

A further embodiment of the foregoing method, wherein forming a metering outlet comprises: forming a plurality of holes through the metering plate.

A further embodiment of the foregoing method, wherein forming the plurality of holes comprises: forming at least one hole through the metering plate; testing flow through the resulting at least one hole; forming additional holes through the metering plate; and re-testing flow through all resulting holes.

A further embodiment of the foregoing method, wherein a diameter and a number of the plurality of holes are selected to permit a desired flow rate of outlet air flow resulting in the desired back pressure.

A further embodiment of the foregoing method, further comprising: determining a second desired back pressure across a second flow path through the aerospace component; forming a metering outlet through a second metering plate based on the second desired back pressure; replacing the metering plate with the second metering plate; and sensing a second back pressure across the flow master using the airflow testing system.

A flow master configured to mate with a testing apparatus for testing airflow characteristics of an aerospace component, the flow master comprising: a first sealing surface matching a first sealing surface shape of the aerospace component, and having a first inlet aperture corresponding to a first internal airflow path of the aerospace component; a hollow body extending from the first sealing surface and defining an interior space fluidly accessible via the inlet aperture, the hollow body having a duct opening; a metering plate secured in a fluid seal across the duct opening of the hollow body, the metering plate having a metering outlet selected to determine an overall flow loss and resulting back pressure across the flow master.

The flow master of the preceding paragraph can optionally include, additionally and/or alternatively, any one or more of the following features, configurations and/or additional components:

A further embodiment of the foregoing flow master, further comprising: a second sealing surface matching a second sealing surface shape of the aerospace component, and situated at an opposite end of the hollow body from the first sealing surface; and wherein the flow master is configured to be retained at the testing apparatus via a clamping force exerted on the first and second sealing surfaces.

A further embodiment of the foregoing flow master, wherein the hollow body comprises a hollow strut extending between the first sealing surface and the second sealing surface.

A further embodiment of the foregoing flow master, wherein the duct opening is situated in an outlet section extending from the hollow strut.

A further embodiment of the foregoing flow master, wherein the metering plate is secured to the duct opening via a band clamp.

A further embodiment of the foregoing flow master, wherein the metering plate is secured to the duct opening via an O-ring seal.

A further embodiment of the foregoing flow master, wherein the first sealing surface and the hollow body are formed of aluminum.

A further embodiment of the foregoing flow master, wherein the metering outlet comprises a plurality of holes extending through the metering plate.

A further embodiment of the foregoing flow master, wherein the first sealing surface forms a fluid seal with the testing apparatus.

A further embodiment of the foregoing flow master, wherein the metering plate consists of a planar element.

A further embodiment of the foregoing flow master, wherein the planar element is a planar disk.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for evaluating a flow testing system for an aerospace component using a flow master, the method comprising:
    determining an desired back pressure through a flow path through the aerospace component;
    forming a metering outlet through a metering plate of the airflow master based on the desired back pressure;
    attaching the metering plate to a hollow body of the airflow master, in a fluid seal;
    positioning a first sealing surface of the flow master at a mounting location of the airflow testing system;
    securing the flow master to the airflow testing position in a fluid seal;
    flowing air through the flow master;
    sensing back pressure across the flow master using the airflow testing system; and
    evaluating the airflow testing system based on a difference between the desired back pressure and the sensed back pressure.

2. The method of claim 1, wherein determining the desired back pressure comprises:
    sensing back pressure across the flow path through an ideal physical copy of the aerospace component.

3. The method of claim 1, wherein positioning the first sealing surface at the mounting location comprises:
    aligning geometry of the first sealing surface identical to corresponding sealing surface geometry of the aerospace component with complementary geometry of a first sealing mold of the airflow testing system.

4. The method of claim 3, wherein securing the flow master to the airflow testing position comprises:
    clamping the first sealing surface to the first sealing mold.

5. The method of claim 4, further comprising:
    exerting a clamping force on a second sealing mold complementary to a second sealing surface opposite the hollow body from the first sealing surface.

6. The method of claim 1, wherein forming a metering outlet comprises:
    forming a plurality of holes through the metering plate.

7. The method of claim 6, wherein forming the plurality of holes comprises:
    forming at least one hole through the metering plate;
    testing flow through the resulting at least one hole; and
    forming additional holes through the metering plate; and
    wherein sensing back pressure further comprises re-testing flow through all resulting holes.

8. The method of claim 1, wherein a diameter and a number of the plurality of holes are selected to permit a desired flow rate of outlet air flow resulting in the desired back pressure.

9. The method of claim 1, further comprising:
    determining a second desired back pressure across a second flow path through the aerospace component;

forming a metering outlet through a second metering plate based on the second desired back pressure;

replacing the metering plate with the second metering plate; and sensing a second back pressure across the flow master using the airflow testing system.

10. A flow master configured to mate with a testing apparatus for testing airflow characteristics of an aerospace component, the flow master comprising:

a first sealing surface matching a first sealing surface shape of the aerospace component, and having a first inlet aperture corresponding to a first internal airflow path of the aerospace component;

a hollow body extending from the first sealing surface and defining an interior space fluidly accessible via the inlet aperture, the hollow body having a duct opening;

a metering plate secured in a fluid seal across the duct opening of the hollow body, the metering plate having a metering outlet selected to provide an overall flow loss and resulting back pressure across the flow master.

11. The flow master of claim 10, further comprising:

a second sealing surface matching a second sealing surface shape of the aerospace component, and situated at an opposite end of the hollow body from the first sealing surface; and wherein the flow master is configured to be retained at the testing apparatus via a clamping force exerted on the first and second sealing surfaces.

12. The flow master of claim 10, wherein the hollow body comprises a hollow strut extending between the first sealing surface and the second sealing surface.

13. The flow master of claim 12, wherein the duct opening is situated in an outlet section extending from the hollow strut.

14. The flow master of claim 10, wherein the metering plate is secured to the duct opening via a band clamp.

15. The flow master of claim 10, wherein the metering plate is secured to the duct opening via an O-ring seal.

16. The flow master of claim 10, wherein the first sealing surface and the hollow body are formed of aluminum.

17. The flow master of claim 10, wherein the metering outlet comprises a plurality of holes extending through the metering plate.

18. The flow master of claim 10, wherein the first sealing surface forms a fluid seal with the testing apparatus.

19. The flow master of claim 10, wherein the metering plate consists of a planar element.

20. The flow master of claim 19, wherein the planar element is a planar disk.

* * * * *